US008027790B2

(12) United States Patent
Burtz et al.

(10) Patent No.: US 8,027,790 B2
(45) Date of Patent: Sep. 27, 2011

(54) INTERPRETATION AND MAPPING OF ELECTROMAGNETIC SURVEY DATA (75) Inventors: Olivier M. Burtz, Houston, TX (US); Mark Stiver, Sugar Land, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 545 days.

(21) Appl. No.: 12/303,671

(22) PCT Filed: Aug. 1, 2007

(86) PCT No.: PCT/US2007/017161
§ 371 (c)(1),
(2), (4) Date: Dec. 5, 2008

(87) PCT Pub. No.: WO2008/024184
PCT Pub. Date: Feb. 28, 2008

(65) Prior Publication Data
US 2010/0179761 A1    Jul. 15, 2010

Related U.S. Application Data

(60) Provisional application No. 60/839,785, filed on Aug. 24, 2006.

(51) Int. Cl.
*G01V 1/40* (2006.01)
(52) U.S. Cl. .......................................................... 702/6
(58) Field of Classification Search .................. 702/6–13
See application file for complete search history.

(56) References Cited

U.S. PATENT DOCUMENTS

| | | |
|---|---|---|
| 6,603,313 B1 | 8/2003 | Srnka |
| 2005/0077902 A1 | 4/2005 | MacGregor et al. |
| 2005/0251340 A1 | 11/2005 | Tompkins |
| 2006/0197534 A1 | 9/2006 | Green et al. |
| 2006/0211788 A1 | 9/2006 | Krohn |

FOREIGN PATENT DOCUMENTS

WO    WO 99/28767    6/1999

OTHER PUBLICATIONS

Ellingsrud, S. et al. (2002), "Remote Sensing of hydrocarbon layers by seabed logging (SBL): Results from a cruise offshore Angola", The Leading Edge 21, pp. 977-982.*
EP Search Report & Written Opinion, RS 114417 dated Feb. 2, 2007.
PCT International Search Report dated Sep. 2, 2008 for PCT/US2007/017161.
Mitsuhata, Y. et al. (2002) "2.5-D inversion of frequency-domain electromagnetic data generated by a grounded-wire source," *Geophysics* 67, No. 6, pp. 1753-1768.
Pennwell (1993) "Joint UK Project Developing Basin Geology," *Offshore*, Tulsa, OK 53, No. 4, pp. 86-87.

* cited by examiner

*Primary Examiner* — Drew A Dunn
*Assistant Examiner* — Stephen Cherry (57) ABSTRACT

A structured computer-implemented method (1000) based on graphical user interfaces for interpretation and mapping of data from a controlled-source electromagnetic survey, featuring capability to store electromagnetic data in layers (1004), each layer having the same internal structure for ease of comparison, editing, display and other manipulation by an assortment of software tools (1005) useful to an interpreter. Thus, different layers might contain actual data (1001) from different surveys and simulated results (1002) based on different resistivity models or inversion results (1003), all pertaining to the same subterranean survey region.

21 Claims, 10 Drawing Sheets

Define Initial Model

Water Layer: — 701

Polynomial Coefficients:

| lnZ^3 | lnZ^2 | lnZ^1 | lnZ^0 |
|---|---|---|---|
| 0 | 0 | 0 | 0.2 |

[50] Bottom of Layer 1

| 0 | 0 | 0 | 0.25 |

[500] Bottom of Layer 2

| 0 | 0 | 0 | 0.28 |

[1000] Bottom of Layer 3

| 0 | 0 | 0 | 0.3 |

Automatic: [100] m Above Sea Floor

| 0 | 0 | 0 | 0.3 |

Automatic Sea Floor

Depth Step in Water: [50]

Minimum Resistivity: [0.2]   Maximum Resistivity: [0.3]

Fixed Water Layer

Transition Sediment: — 702

Thickness: [100]   Step: [25]   Resistivity: [0.15] to [1.0]

Fixed Water Layer

Sediment: — 703

Step 1: [200]
Step 2: [200]   Linear
Maximum Thickness: [2000]   1/2-Space Resistivity: [2] — 705
Initial Resistivity: [1]   Bounds: [0.5] to [200]
Invert 1/2-Space Resistivity — 704
Keep data (km): [(0.5:0.2:8)] — 706
Error: [0.1]
— 707

OK   Cancel

INTERPRETATION AND MAPPING OF ELECTROMAGNETIC SURVEY DATA

This application is a National Stage entry under 35 U.S.C. 371 of PCT/US2007/17161 that published as WO 2008/024184 and was filed on Aug. 1, 2007 and claims the benefit of now expired U.S. Provisional application 60/839,785 which was filed on Aug. 24, 2006.

FIELD OF THE INVENTION

This invention relates generally to the field of geophysical prospecting and reservoir delineation, and more particularly to interpretation of electromagnetic data. Specifically, the invention is a computer software program for aiding interpretation of electromagnetic data and resistivity mapping of a subterranean region.

BACKGROUND OF THE INVENTION

Controlled-source electromagnetic ("CSEM") surveying is a powerful tool for hydrocarbon exploration. To map resistivity anomalies that can be related to hydrocarbon fields, raw survey data (measurements of one or more components of the electric or magnetic fields) are processed, then interpreted. Interpreting CSEM data consists of developing a model of the earth's resistivity that is consistent with the measured CSEM data and with any other available geophysical or geological information. While they are not necessarily practiced in this order, interpretation typically includes the steps of:

Understanding which features of the data may properly be regarded as signal and which features as noise;
Understanding how the signal varies in space;
Understanding how the signal varies with frequency;
Understanding how the signal varies among the x, y, z components of the data, in both amplitude and phase;
Constructing approximate resistivity models of the earth in 1, 2 and 3 dimensions;
Constraining those models with additional information, such as well logs or seawater resistivity profiles; or structural information derived from seismic or gravimetric or magnetic data.
Forward-modeling synthetic electromagnetic field data based on those earth models and the source-receiver configurations in the measured data;
Comparing those actual and synthetic data to understand how the anomalies or misfits vary in space, among frequencies, or among data components;
Comparing synthetic data to synthetic data to understand how changes in the earth model impact synthesized data;
Modifying the earth model and re-synthesizing data;
Inverting the measured data; and,
Evaluating the resistivity models together with other geophysical measurements for evidence of hydrocarbon accumulations.

Typically, CSEM data is collected by individual receivers (laid on the sea floor) that record the signal emitted by a transmitter towed a few meters above the sea floor (however, in some experiments, the transmitter can also be fixed). CSEM surveys can be large and complex. For example, a survey might involve 7 tow lines, 90 receivers, and 10 or more discrete frequencies. Each receiver may record up to 6 electric and magnetic field components. In addition, the CSEM data may have been processed in more than one way in order to improve some signals at the expense of others or to convey uncertainties present in the data. Furthermore, many synthetic data sets may be produced as part of the iteration cycle for reconciling the measured data with an earth resistivity model. Therefore, the CSEM interpreter faces the daunting bookkeeping challenge in ensuring that all of the measured data are explained in terms of a single resistivity model of the earth.

Some recent publications and patents address one or another part of these problems, or present final results with little discussion of the tools employed. Often, literature only presents final results. See, for instance U.S. Patent Publication 2005/0077902; and S. Ellingsrud et al., *The Leading Edge* 21, 972-982 (2002). There is a need for a tool that integrates the full process of interpreting the CSEM data.

SUMMARY OF THE INVENTION

Figure 10:
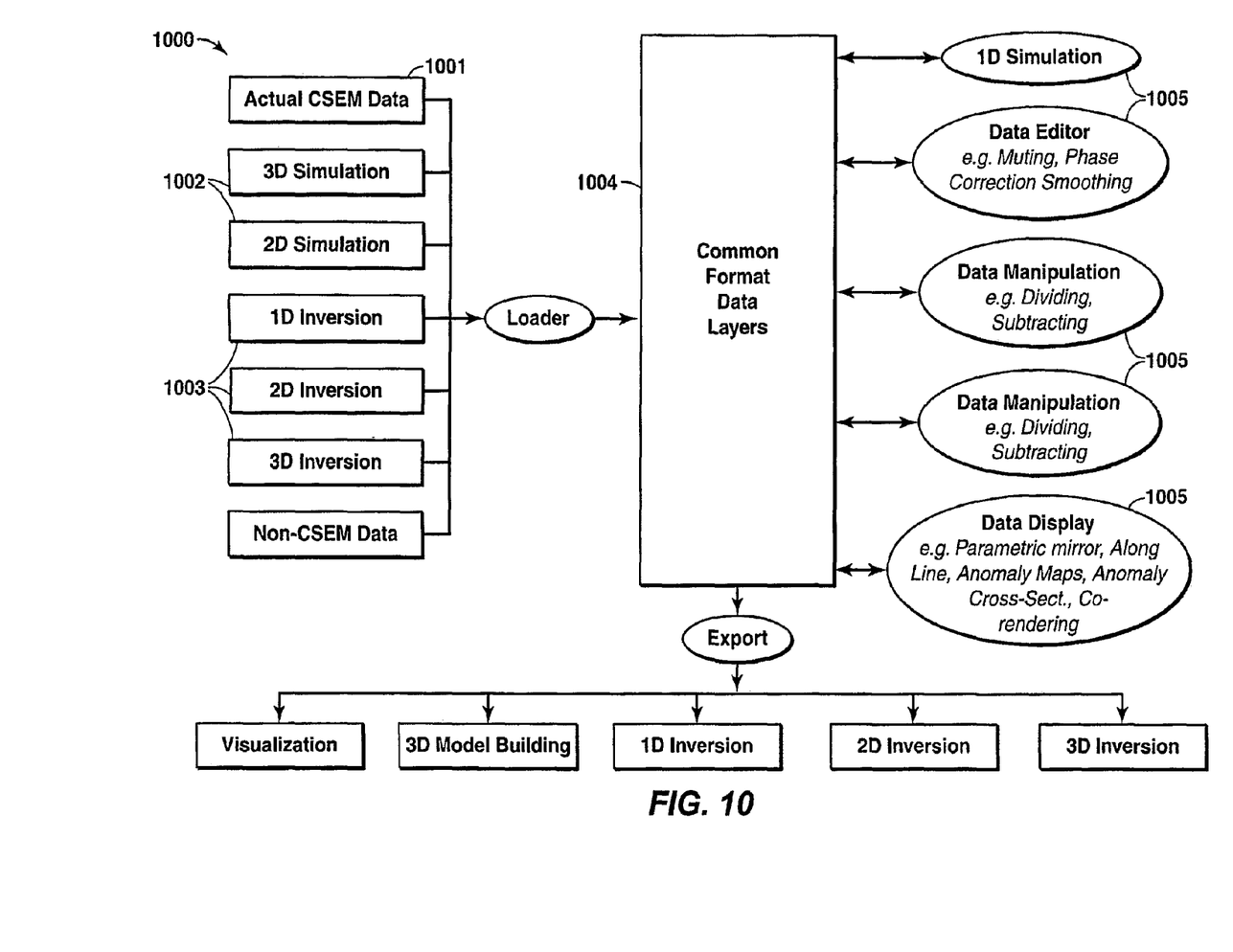
FIG. 10 is a programming flow chart for certain embodiments of the present invention.

In one embodiment with reference to FIG. 10, the invention is a computer implemented method 1000 for interpreting data from a controlled-source electromagnetic survey of a subsurface region, comprising:

(a) providing a graphical user interface allowing selection of electromagnetic data and their manipulation or display by one or more selected tools;

(b) providing a plurality of data manipulation and display tools 1005, each accessible from a graphical user interface;

(c) providing layered data storage 1004 for frequency-domain electromagnetic field data volumes, each layer corresponding to a certain survey source line, frequency and receiver, and being allocated to receive at least the following types of data or information:

(A) frequency;
(B) type of processing used for actual data, or identification of resistivity model assumed for synthetic data;
(C) receiver identification and geometry information for survey receivers, including (x,y,z) coordinates and 3D orientation angles;
(D) source information including (x,y,z) location and data specifying source antenna shape as a function of time; and
(E) electromagnetic data, either actual (1001) or simulated (1002), corresponding to parameters (A)-(D);
wherein the electromagnetic data in each layer, whether real data or synthetic data, are stored with the same internal structure; and (d) using a software program comprising the features provided in steps (a)-(c) to interpret the electromagnetic data to predict whether the subsurface region contains hydrocarbons.

In some embodiments of the invention, computer data storage is also provided for resistivity data in connection with inversion operations (1003).

BRIEF DESCRIPTION OF THE DRAWINGS

The present invention and its advantages will be better understood by referring to the following detailed description and the attached drawings in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

The present invention addresses the integrated interpretation (of EM survey data) problem by means of a structured computer program, which may be referred to herein as EMIM (Electro-Magnetism Interpretation and Mapping), that in certain embodiments of the invention includes mechanisms for:

Managing and selecting actual CSEM Data (processed common-receiver gathers);

Creating, managing and selecting synthetic CSEM Data and for maintaining its identification with the Earth Resistivity Models on which it is based;

Co-displaying any combination of actual and synthetic data by means of one or more display tools (such as amplitude and phase versus offset, cross-section, relative amplitude pseudo-section, or relative amplitude map);

Applying Data Adjustment tools (such as muting, smoothing or phase correction) to the actual CSEM Data prior to display or inversion;

Developing earth resistivity models from inversion of actual CSEM Data;

Editing or modifying earth resistivity models for the purpose of creating additional synthetic data; and, Constraining those earth resistivity models based on non-CSEM data.

Input/output links to simulation and inversion packages.

Input/output links to 3D visualization packages.

Input/output of resistivity logs (1 dimension) or resistivity profiles (2 dimensions) or resistivity cubes.

Figure 1:
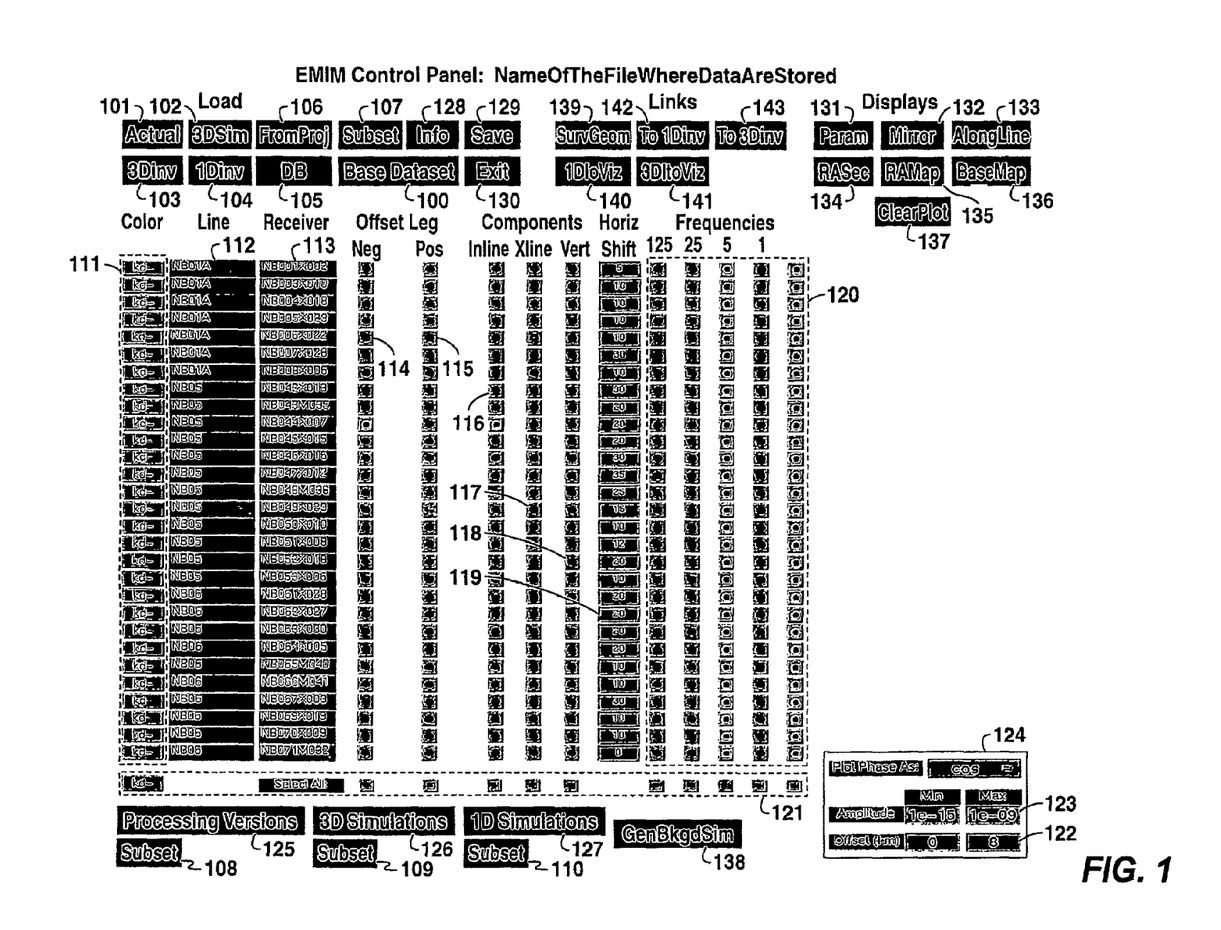
FIG. 1 shows the control panel display, the primary graphical user interface, for one embodiment of the present invention.

EMIM is a user-friendly tool based on graphical user interfaces. The main panel, which may be called the EMIM Control Panel, allows the input/output and the selection of the CSEM data and their display or manipulation through command buttons. An example of a control panel for the present invention is shown in FIG. 1. Various CESM data interpretation operations are described in the following paragraphs with reference to the actuating locations in FIG. 1. Each feature described does not necessarily appear in all embodiments of the invention.

Loading Data

Actual data are loaded from the processing package 101. Actual data may have been recorded and processed in a geodetic coordinate system different than the coordinate system to be used at the interpretation stage. In this case, the program performs the coordinate transform "on the fly." The horizontal components of the electric and magnetic fields of each receiver are also, at the user's option, re-oriented into the components parallel and perpendicular to the average tow line direction. Several versions of processed data can be loaded together. They are labeled by a processing version name provided by the user.

3D simulation results (from an external software program) may be loaded from 3D forward-modeling output files 102. Usually, they are in the interpretation geodetic system in which case no coordinate transformation is required. They are labeled by a scenario name provided by the user. The horizontal components of the electric and magnetic fields of each receiver are also, at the user's option, re-oriented into the components parallel and perpendicular to the average tow line direction. Where actual data exist, simulation data may be mapped to actual data based on the direction of the tow line and the receiver location.

Simulations corresponding to the 3D inversion results may be loaded from an external 3D inversion package 103. They are normally in the interpretation geodetic system in which case no coordinate transformation is required. They are labeled by the inversion name as provided by the user. The horizontal components of the electric and magnetic fields of each receiver may also be re-oriented into the components parallel and perpendicular to the average tow line direction. Simulation data corresponding to the 3D inversion results may be mapped to actual data based on the direction of the tow line and the receiver location.

1D inversion results (simulations and resistivity profiles) are loaded from the output files of the 1D inversion package 104 which, in some embodiments, is part of the present invention.

Data editing functions are also provided 105; for example, the survey name and general comments can be modified, actual or simulated data can be renamed or deleted (on a receiver or frequency basis), or entire simulation datasets can be removed.

Managing CSEM Data (as Common-receiver Gathers)

Actual CSEM data, 1D, 2D and 3D simulated data (generically known to as synthetic data) can be found in very different formats because of the different computer programs used to generate them. They also can represent electric or magnetic fields. The present invention has a feature called "EM Data Layer" where these different types of data are structured in the same way which makes it very easy to display or combine them together.

The structure of the EM Data Layer (sometimes referred to herein as internal structure) may vary, from one embodiment of the invention to another, depending upon the program designer's preferences, but a typical choice for common internal structure features might be:

Name of the survey

Area of the survey (i.e. country, license number)

Miscellaneous comments (i.e. operator, contractor)

Type of the data (actual or synthetic, electric or magnetic fields).

Version. For actual data, this is typically the kind of processing. For synthetic data, it is typically the name of the scenario. For instance, in the case of a 3D simulation, the entry in the version field will typically make reference to the resistivity cube the synthetic was generated from.

Unique name of the receiver

Unique name of the transmitter line.

X, Y, Z coordinates of the receiver and the orientation of its horizontal and vertical antenna with respect to the geographic North (azimuth) and the vertical (tilt).

X, Y, Z coordinates of the transmitter locations and their signed distance away from the receiver (signed offset). Conventionally, the offset is negative where the transmitter is towed toward the receiver; it is positive where it is towed away. Also stored at the same location (in some embodiments of the invention) are the azimuth, pitch, length and altitude above the sea floor of the transmitter, the conductivity of the sea water measured at the transmitter, the Julian date and the current intensity at the different transmitter locations. More accurate interpretations of CSEM data require keeping track and taking into account the shape of the transmitter. As used herein, the terms source and transmitter are used interchangeably, and refer to the (usually flexible) dipole antenna (in the case of an electric dipole source) by which a selected current signal is transmitted (into sea water in most applications) rather than to the signal generator, sometimes called a power waveform synthesizer, that is connected to the transmitting antenna.

Average line through the transmitter positions (characterized by its azimuth and the coordinates of one point). The transmitter positions are generally located along a line that can be somewhat crooked. The program feature of approximating the geometry of each transmitter gather by an average line proved very powerful in tests of the present invention, particularly in the data loading process and in displaying or manipulating CSEM data. The average line may be characterized by an angle (direction in the horizontal plane) and an average point (X, Y, Z coordinates).

Bulk horizontal shift (commands 119 in FIG. 1). Depending on the contractor and the processing, experience in developing the present invention has shown that the fit between the actual data and the synthetic is often improved if the locations of the transmitter are shifted by a constant amount (usually between 0 and 100 m). The underlying theory is not presently understood, but this optional shift can often significantly help interpretation. Of course, the horizontal shift of synthetic data is always zero.

Electric or magnetic field values at a given frequency. These complex numbers (in the frequency domain) are stored. The data will consist of however many components of the vector field were measured (or simulated). For 3D data, the typical three components into which the data are resolved are: parallel to the average tow line direction, perpendicular to the average tow line direction, and vertical.

Original values of the electric or magnetic fields. A user can interactively alter the values of the electromagnetic field (for instance by smoothing). Preserving the original values makes the 'undo' function possible.

Mute code. With this feature, any part of the gather can be muted out. The mute code keeps track of what is active or inactive (muted out).

Phase shift. CSEM transmitters and receivers each have their own built-in clocks, and their synchronizations are imperfect. Usually, phase corrections are done during the processing steps that precede use of the present invention, but additional correction may be useful during the interpretation. This field keeps track of any such corrections.

Miscellaneous weights. For example, data for inversion may be weighted, for instance by a quality factor.

Resistivity. A resistivity model to be used in the 1D simulation module of the present invention would be stored here for example; or a resistivity profile along the average tow line direction.

CSEM is a rapidly evolving technology; additional parameters can be easily added to or existing parameters can be changed or removed from the "EM Data Layer".

Selecting Data

A significant feature in many embodiments of the invention is the ability to co-render or combine any gather of any kind from anywhere in the survey. For instance, a gather from a receiver on a north-south line in the south-west corner of a survey can be displayed with a gather from a receiver on an east-west line located in the middle of the survey. First, the user selects a "base dataset" [100 in FIG. 1]. This data will lie within a particular layer in the EM Data Layer. This dataset can for example be a version of actual CSEM data or any 3D simulation. In balancing computer utilization with desirability of particular features, a preferred embodiment of the invention may be one in which only the base dataset can be edited interactively. Other processing versions or 3D simulations of different scenarios and various 1D synthetics can be added to the displays (i.e. co-rendered) with selected colors and symbols, but they cannot be edited in this embodiment. The program might be designed to not limit the amount of data that can be plotted together. Instead, the only limitation would be the ability of the user to interpret the data. The EM Data Layer can be so flexible that it is easy to display data even from two different areas in the world. In the Control Panel of FIG. 1, such foreign data points are extracted from an existing EMIM database (having been read into memory and converted to the common internal structure as a separate layer in EM Data Layer) through the command FromProj 106.

The aforementioned co-rendering and editing operations are all implemented by the user through the EMIM Control Panel (FIG. 1), which is the graphical user interface that allows such flexibility. Particular features for selecting data in an embodiment of the invention might include sub-setting the data.

CSEM surveys can be large and complex. They can involve hundred of receivers, lines and frequency combinations. General operations or data combinations can be performed on the whole datasets, but for detail analysis, it is usually required to work on more manageable sub-datasets. At the beginning of a session, or through the "Subset" command 107, a user can select part of a survey by sorting by receiver names or line names or graphically on a base-map. It is also possible with the control panel of FIG. 1 to select (using the buttons 120) only the data corresponding to one or more desired frequencies in the frequency spectrum of the particular source waveform used in the survey data acquisition. A pre-selection between all the available processing versions, 3D synthetic data or 1D synthetic data can also be done through commands 108, 109, 110, respectively.

As stated previously, the EMIM Control Panel of FIG. 1 enables the user to select actual or synthetic CSEM data gathers, data components, frequencies, and offsets. (A gather is the electromagnetic data corresponding to one particular receiver and one particular tow line. It is the data that were recorded at the particular receiver when the source was emitting electromagnetic signal along the particular tow line.) The first column of buttons 111 specifies the color, the symbols and the line thickness of a gather, in the embodiment illustrated by FIG. 1. Gathers are uniquely identified by their line name in the second column 112 and their receiver name in the third column 113. The fourth column of buttons 114 permits the selection of positive offsets and those of the fifth column 115 the selection of negative offsets. (Offset is horizontal distance between source and receiver when the particular data point was recorded by the receiver.) Horizontal inline components (parallel to the average tow-line), horizontal cross-line components (perpendicular to the average tow-line) and vertical components are respectively selected from the sixth to the eighth columns 116, 117, 118. That is, the program has a tool that resolves the measured EM field components into inline, cross-line and vertical components, and these buttons enable the program user to select the desired components. A horizontal bulk shift of the transmitter locations can be entered in the ninth column 119. Columns 10 and beyond enable the selection of frequencies available in the base dataset 120. Column-wise selections (selection of every button in a column) are permitted by the buttons on the lowest row 121. The buttons in the lower right corner of FIG. 1 permit the selection of an absolute offset range 122 and of an amplitude range 123. Button 124 controls the phase display of selected data. The phase can be displayed explicitly (raw or unwrapped) or implicitly through its sine, cosine or other trigonometric functions.

Available processing versions are selected at 125. They may be uniquely defined by their version name. Color, symbols and line thickness can be defined for each selected processing version.

Available 3D-simulations are selected in at 126. They may be uniquely defined by their scenario name. The scenario name will likely make reference to the resistivity model the simulation was generated from. Color, symbols and line thickness can be defined for each selected 3D-simulation.

Available 1D-simulations are selected at 127. They may be uniquely defined by their scenario name. Color, symbols and line thickness can be defined for each selected 1D simulation. Moreover, selecting the 1D Simulation option 127 can be programmed to bring up a Resistivity Log (or resistivity profile) editing and display panel.

Information about processing versions and simulations can be browsed from button 128: receiver and line coordinates and depths, base-map and available frequencies for actual data and simulated data.

Command 129 saves the editing that has been done since the last save. It can also save the settings of the EMIM Control Panel: the selection of lines and receivers, the selection of the processing versions and the simulations and their selected color, symbol and line thickness. These settings allow the user to re-start the application at the same point at a later date.

Command 130 terminates the session. It allows the user to save the project and the configuration of the EMIM Control Panel before exiting.

Editing Data

Figure 2:
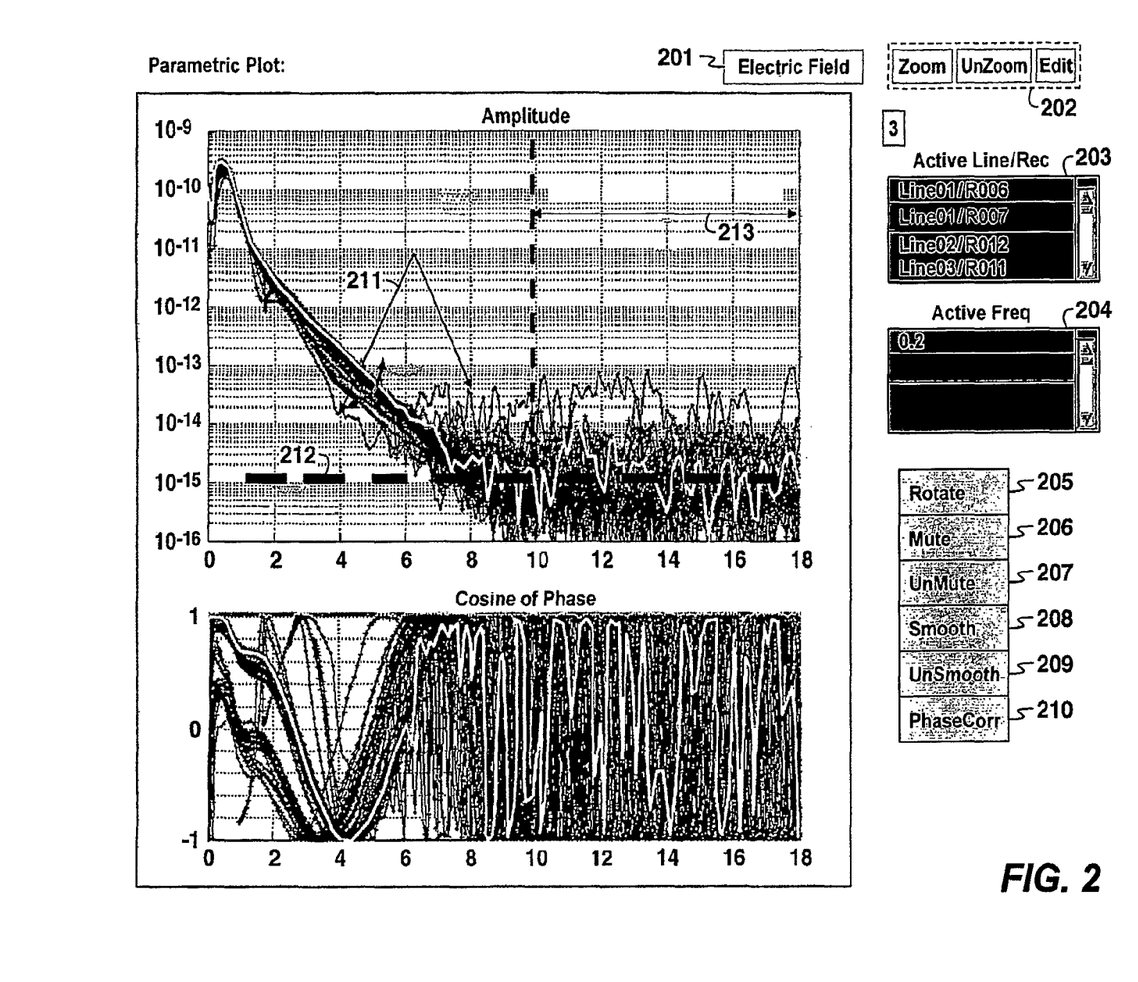
FIG. 2 shows a monitor display of a parametric plot from one embodiment of the present invention.

All selected data are plotted together in the Parametric Display window (command 131 of FIG. 1). FIG. 2 shows another graphical user interface in one embodiment of the present invention. The amplitude and phase of the CSEM data (electric field or magnetic field) are plotted in the same display versus the absolute offsets between the receiver location and the transmitter locations. Negative and positive offset data are plotted with different symbols to allow each offset to be identified. The type of field (electric, magnetic or both) is selected from a popup menu 201.

Such a parametric plot is independent of the actual geographic location of the gathers. It is a convenient way to compare the positive and negative offsets of the same receiver and show if the earth is more resistive or more conductive right or left of a given receiver. It is also the best place to compare actual or simulated data from different locations. The user can zoom, un-zoom or edit the picture using the 202 commands. The names (line and receivers) of the gathers selected in the EMIM Control Panel are visible in a scrollable box 203. The selected frequencies are visible in another scrollable box 204. From these boxes, the user can activate or deactivate any gather and any frequency. By default, all the gathers and all the frequencies that were first selected in the EMIM Control Panel are active. In this embodiment of the invention, active data are highlighted in the scrollable boxes and are displayed with thicker lines on the parametric plot. Editing is applied to the components and offsets of the active gathers and frequencies from the base dataset. Available editing features in the embodiment of the invention illustrated by FIG. 2 are:

Rotate 205. The receiver orientation is determined by polarization analysis or other method at the processing stage. The rotate feature allows the user to test the sensitivity of the CSEM data to the orientation of the active receiver. At the user's choice, additional rotation can be applied and the corresponding values are changed in the EM Data Layer fields.

Mute 206. The user can graphically mute out undesired transmitter locations (usually noisy points) of the active gathers at the active frequencies.

UnMute 207. The un-mute command re-activates the muted transmitter points of the active gathers at the active frequencies in a graphically designed range of offsets.

Smooth 208. The command stacks transmitter points in a user-specified sliding window along the offset axis (a kind of smoothing). It is to be noted that the stacking needs to be performed on complex numbers of the active gathers at the active frequencies.

UnSmooth 209. This command restores the original data values (before re-stacking).

PhaseCorr 210. This command allows the parallel and perpendicular components of the "base dataset" to have their phases adjusted to a selected simulation dataset. The adjusted data can be written out (for example) to a dataset for input into an external 3D inversion package.

Displaying Data

Additional commands in the EMIM Control Panel (FIG. 1) co-render data in many different ways.

Figure 3:
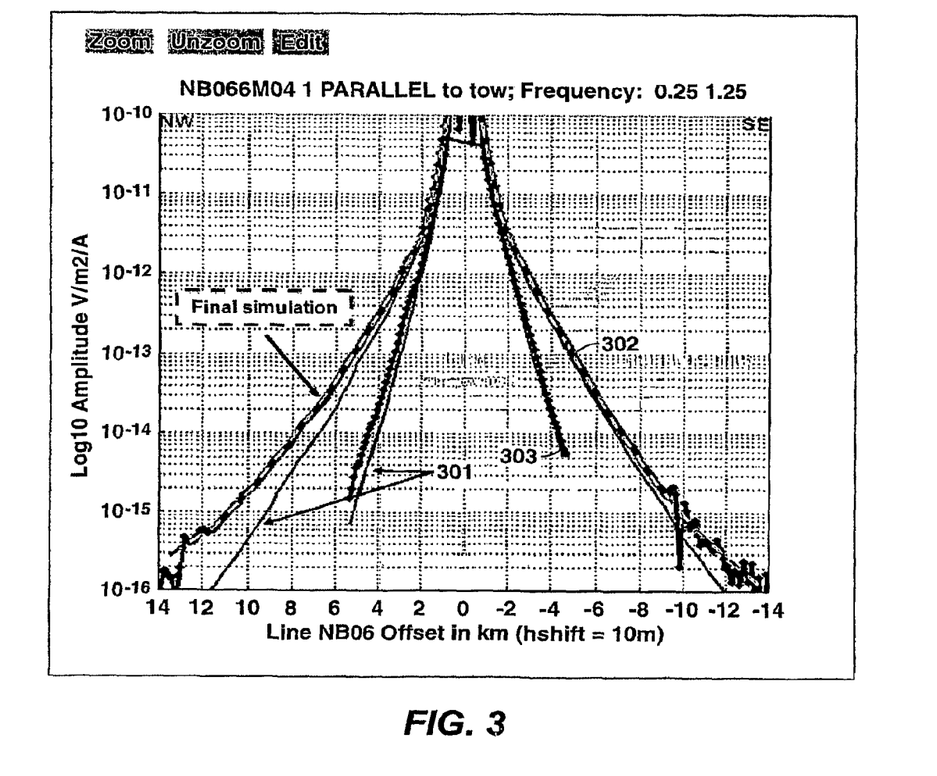
FIG. 3 shows a mirror plot display from one embodiment of the present invention.

Mirror 132 displays selected data receiver by receiver, as illustrated in FIG. 3 for a receiver located at zero on the offset scale. Data curves for two frequencies (0.25 and 1.25 Hz) are displayed. Curves 301 represent a simulation based on an initial resistivity model. Curve 302 represents the actual (measured) data at 0.25 Hz and 303 the actual data corresponding to 1.25 Hz. The initial simulation is very close to the actual data at the higher frequency but not at the lower frequency where a second simulation is performed after adjusting the resistivity model. The second simulation curve falls on top of the actual data curve.

Figure 4:
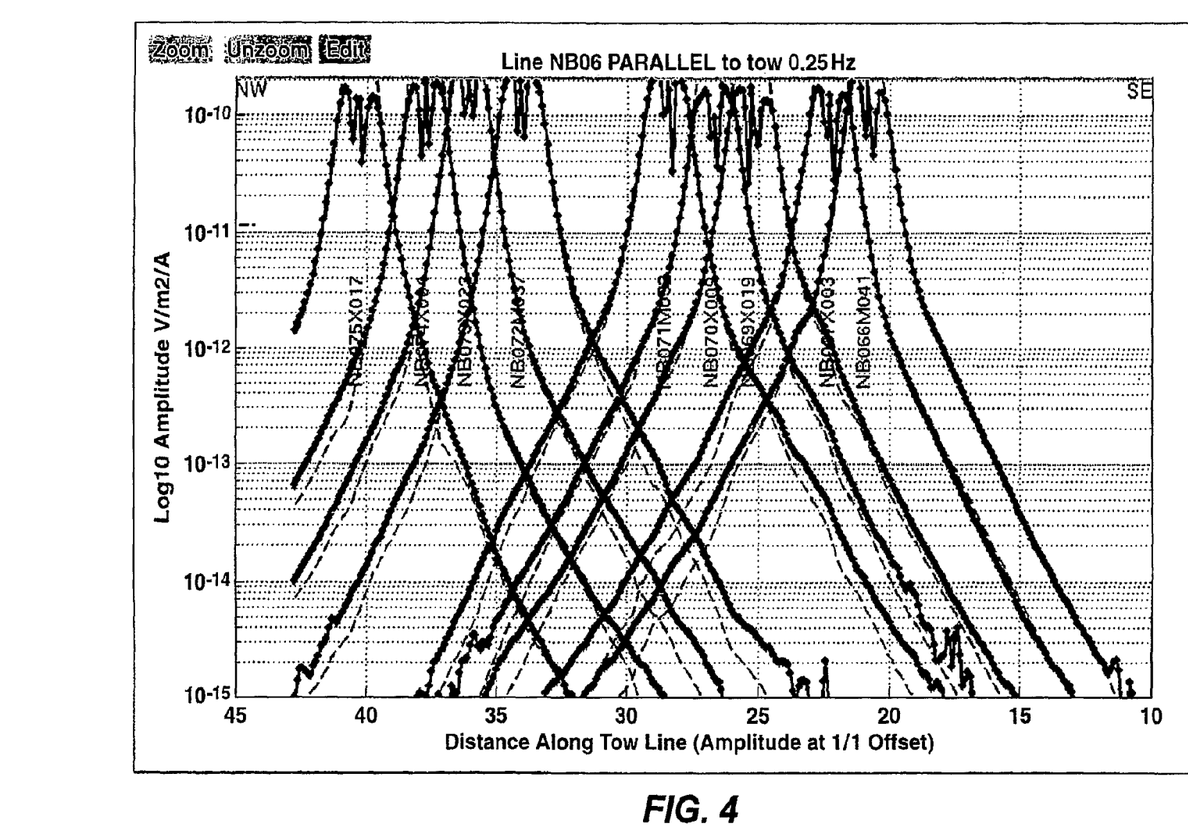
FIG. 4 shows a display from one embodiment of the present invention of a plot of receivers along a tow line.

AlongLine 133 displays data belonging to a common tow line along the line, as illustrated in FIG. 4. The solid lines represent actual data and the dashed lines represent simulated data. Transmitter offsets can be scaled by a user-specified value.

RAsec 134 displays relative amplitude or phase sections. For instance, actual data are normalized by a selected simulation dataset. For example, a vertical section using a color scale to display relative magnitude can be generated to indicate resistivity anomalies in the actual data with respect to the simulated data. See U.S. Patent Publication No US 2006/0197534 ("Method for Identifying Resistivity Anomalies in Electromagnetic Survey Data"). The sections can be exported to a commercial visualization package.

Figure 5:
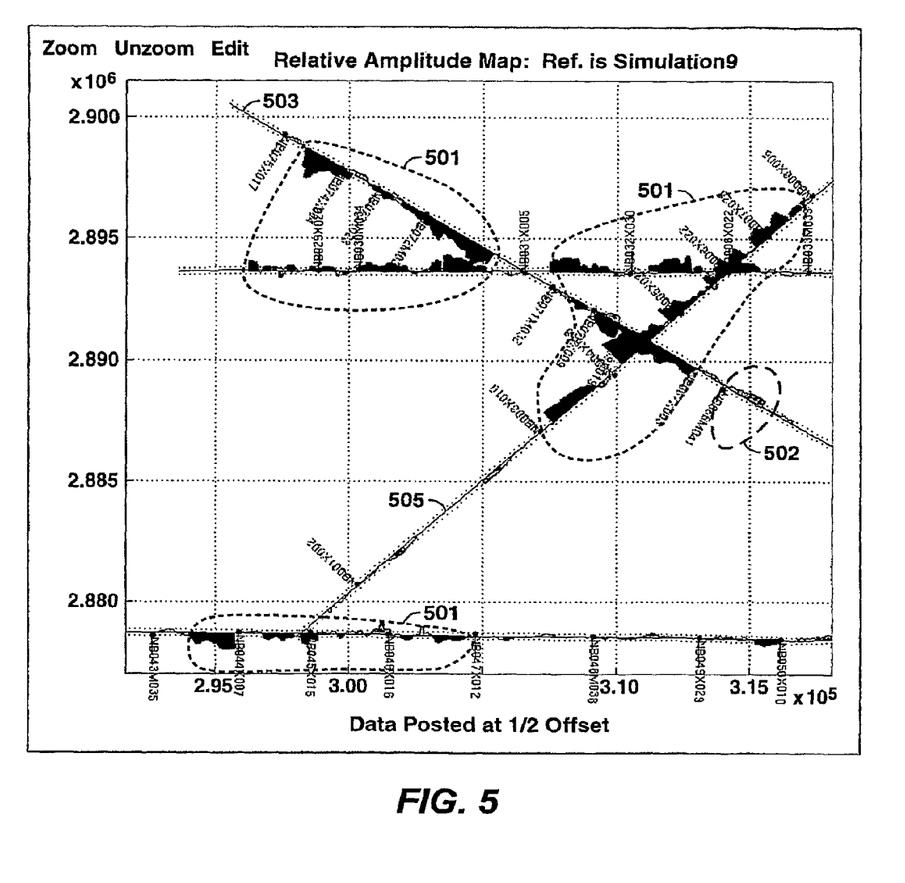
FIG. 5 shows a display from one embodiment of the present invention of a relative amplitude map.

RAmap 135 displays relative amplitude or relative phase maps, as illustrated in FIG. 5, where horizontal (x,y) position is the quantity displayed on the two axes. Actual data are normalized by a reference dataset (for instance a selected simulation dataset). For each receiver, the relative amplitude (or phase) data at a given transmitter location is displayed along the tow-line at the corresponding offset (or at an offset scaled by a factor specified by the user) as a bar perpendicular to the tow line. Four tow lines, 503-506, are shown in the drawing. The length of the bar is proportional to the relative amplitude (or phase). Positive anomalies (the actual data are more resistive than the reference data) are displayed in black on one side of the line. Three regions 501 are indicated that exhibit prominent, mostly positive resistive anomalies. Negative anomalies (the actual data are less resistive than the reference data) are displayed in gray on the other side of the line with; for instance, region 502. In actual practice, a color coding might be preferred for displaying positive and negative relative amplitudes. At a glance, a relative amplitude (or phase) map such as FIG. 5 shows the resistivity anomalies in the actual data with respect to the reference data. The maps can be exported to a commercial visualization package.

BaseMap 136 displays a base map of the selected receivers and lines or of the whole survey.

ClearPlot 137 clears all the plots of displayed data.

Creating 1D Synthetic Data

Only 1D-simulations are performed in many embodiments of the present inventive program because 2D and 3D simulations currently require too much computing resources. Nevertheless, this program enables the user to prepare data as input to the simulation software and provides the link to import 2D or 3D simulation results.

In some embodiments of the invention, the 1D Simulation command (127 in FIG. 1) enables the user to:
 select existing 1D models and display their simulation results in the Parametric Display window,
 allow editing of existing 1D models
 allow creation of new models, and
 run the corresponding simulations through the Resistivity Log window.

Figure 6A:
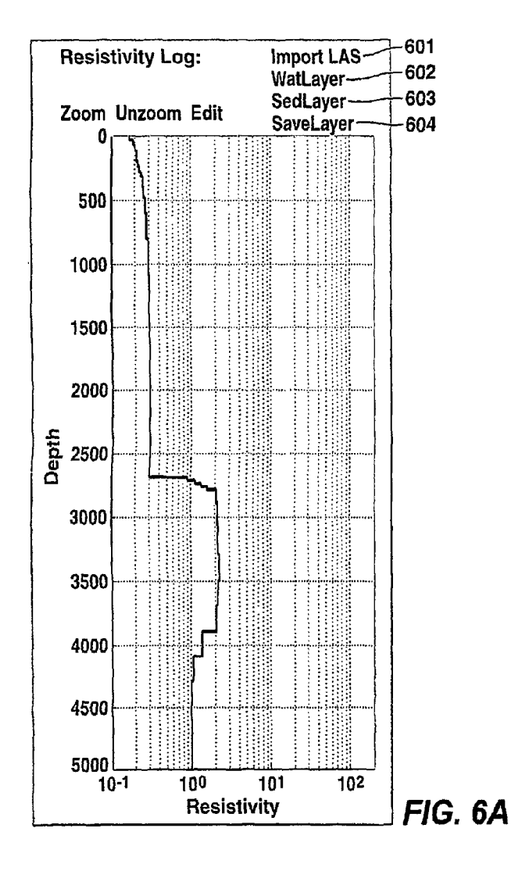
FIG. 6A shows a resistivity depth log from a 1D simulation module.
Figure 6B:
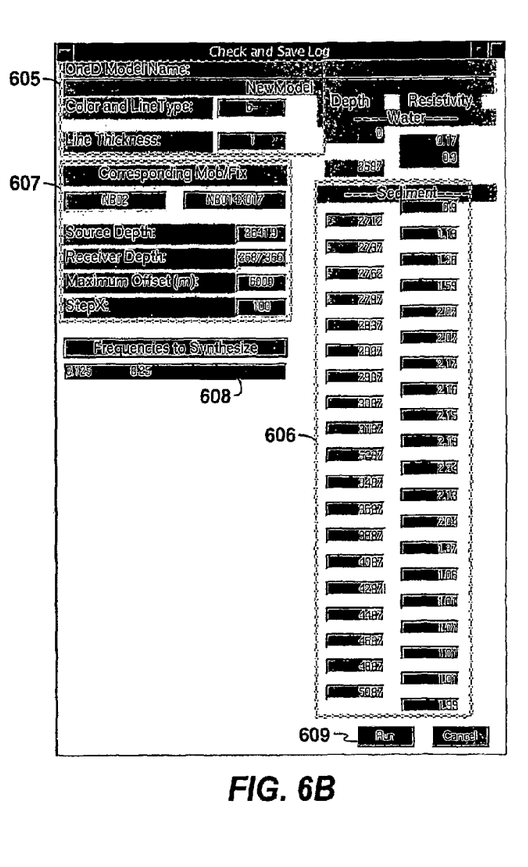
FIG. 6B shows a graphical user interface in one embodiment of the present invention in which a resistivity log can be edited into a form suitable for the resistivity model in a 1D simulation of electromagnetic field values.

The selected 1D model is displayed in FIG. 6A as a depth-profile of resistivity, also known as a resistivity log. It is possible in this embodiment of the invention to import resistivity information from an existing well through an external file in the standard LAS format 601 and use it as a guide. The user can also import measured sea-water conductivity profiles 602 or enter their own profile (linear or exponential profile). Then, the user can graphically edit or add resistivity sediment layers 603. The SaveLayer Command 604 opens the Check and Save Log window, shown in FIG. 6B. Fields 605 define the new model name and display parameters (which can be changed later). The user can check and manually edit the resistivity and depth of the layers in fields 606, define the source and receiver geometry 607, set the desired frequencies 608 and launch the 1D simulation 609. The source and receiver geometry can be automatically retrieved from the EMIM database with the name of the receiver and the name of the tow-line 607. The results are automatically displayed in the Parametric Display window (command 131 in FIG. 1).

Creating Pseudo-simulations

At the user's choice, 1D-simulations can be attached to a selected receiver in the example embodiment of the invention. However, it may be convenient to duplicate the simulation at the location of several (or all) receivers for both the positive and the negative offset legs. In particular, it helps co-rendering 1D-simulations with the display commands 132 to 135. The command GenBkgdSim 138 on the EMIM Control Panel of FIG. 1 generates such pseudo-simulations at the selected locations and the selected frequencies. In the same way, the command GenBkgdSim can duplicate a selected positive or negative offset leg of real data or 3D-simulated data.

Link to Visualization and Modeling Packages

In the example embodiment of FIG. 1, SurvGeom 139 exports the CSEM survey coordinates, the receiver orientation and the transmitter information to commercial visualization packages (e.g., Gocad, Geoframe, Petrel, VoxelGeo, Jason Geophysical Benchmark). Commands like RaSec 134 or RaMap 135 can also export relative sections or maps to commercial visualization packages. 1DItoViz 140 reformats the resistivity models resulting of 1D inversion into a file that can be read by commercial visualization packages. 3DItoViz 141 reformats the resistivity model resulting from 3D inversion into a file that can be read by commercial visualization packages.

Link to Inversion Packages

Figure 7:
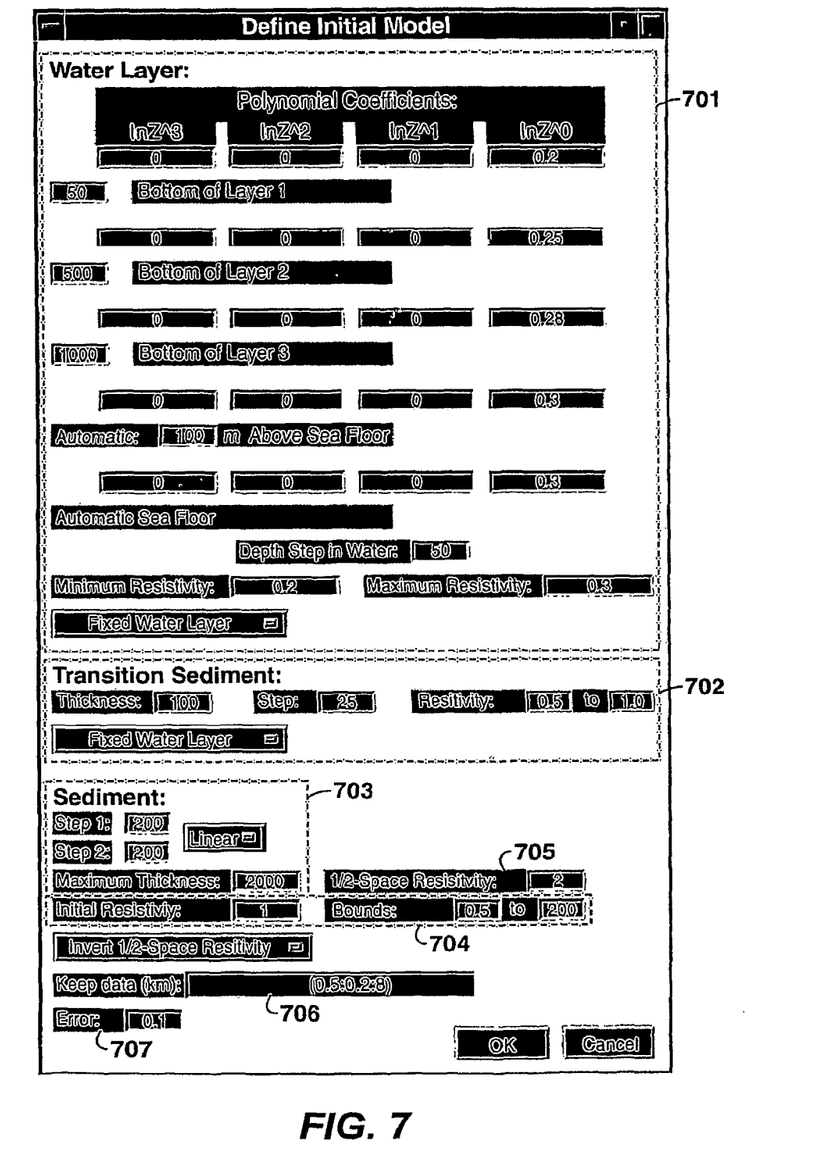
FIG. 7 shows a graphical user interface in one embodiment of the present invention for defining an initial resistivity model for a 1D inversion computation.

The command To_1Dinv 142 prepares the data selected in the EMIM Control Panel for 1D inversion. The selected data are displayed in the Parametric Plot window, and the Define Initial Model window is displayed as illustrated in FIG. 7. In this window the user defines:
 A sea-water resistivity profile 701. The default is the sea-water of the most recently selected 1D simulation.
 A transition zone between sea-water and sediment 702
 The thickness of the sediment layers to be inverted 703
 The inversion bounds and the initial resistivity in the layers 704
 A lower half-space 705
 If the data need to be decimated 706
 The convergence criteria 707

The sea-water zone, the transition zone, the half-space and some of the sediment layers can be fixed and kept constant during the inversion process. The selected data and the corresponding initial models are written in a format suitable to the 1D inversion package, which may be an external program but could possibly be a tool within the present invention. The command To_3Dinv 143 writes the data selected in the EMIM Control Panel into a format suitable to a 3D inversion package.

Typical Work Flow

Figure 8:
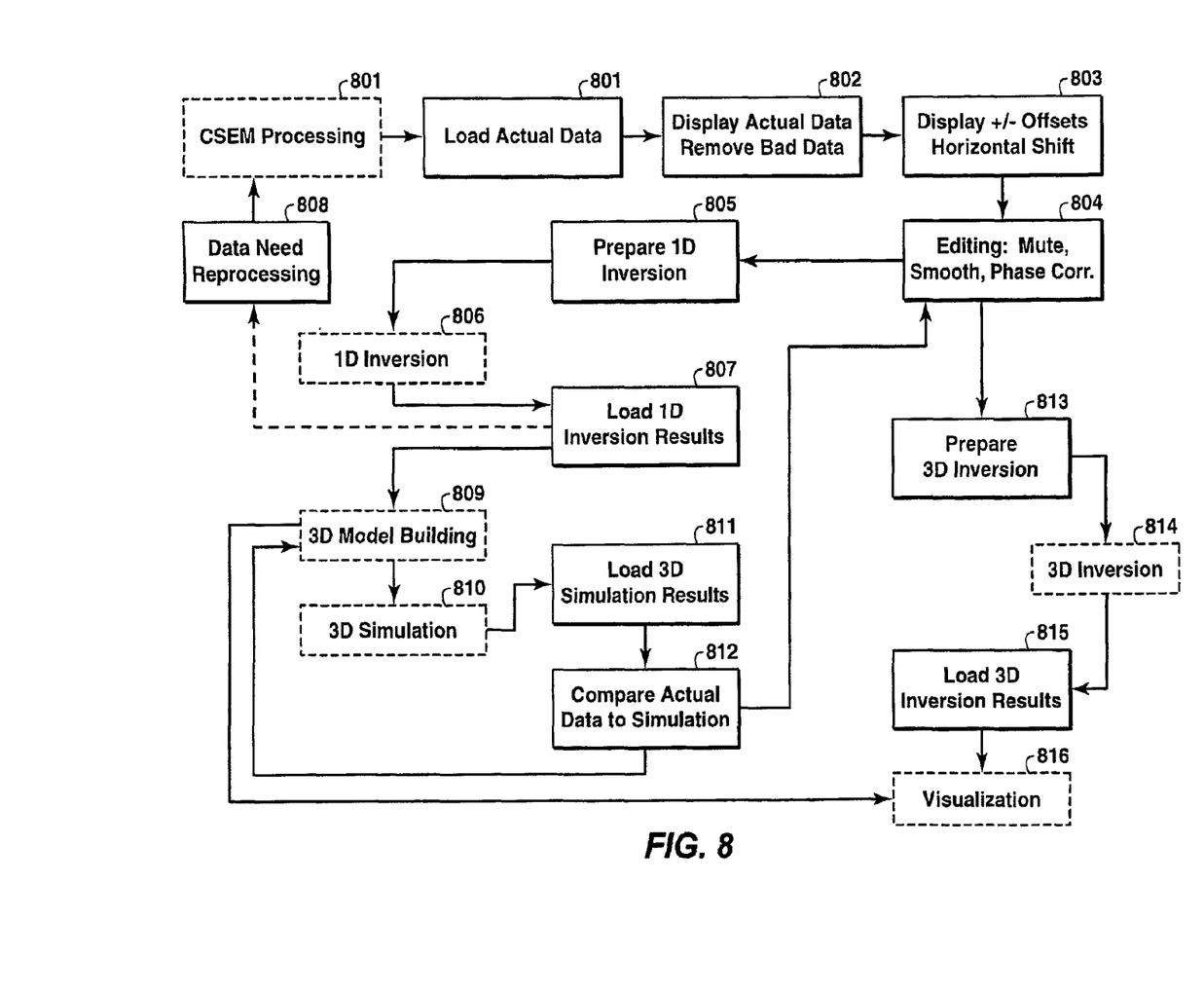
FIG. 8 is a flow chart of an example work flow using the present invention.

FIG. 8 shows a typical workflow of a CSEM interpretation study using the example embodiment of the invention suggested by FIG. 1. The choices made by the user in the example work flow that follows are intended to illustrate the capabilities of one embodiment of the invention.

1. Actual data is loaded first, at step 801. Several processing versions 800 can be loaded at the same time for comparison into different layers of EM Data Layer, each layer being converted to a common internal structure, preferably during the loading process.

2. At step 802, from the EMIM Control Panel, using button 131 in FIG. 1, the user displays all receivers in the Parametric Display window (FIG. 2) for several frequencies, typically the lowest, the highest and selected intermediate ones. The receivers with bad channels are obvious 211. The general noise level 212 is estimated for each frequency. The user can delete bad receivers with the data-base editing tools (command 105 in FIG. 1) or simply deselect them in the Parametric Display window. Then, the offsets where the amplitude is below the noise level are usually muted (command 206). This muting makes subsequent plots much simpler and clearer. For instance, in FIG. 2, the offsets greater than 10 km will be muted 213. Once the data have been cleaned, an assessment can be made of the resistivity variability in the displayed data.

Figure 9A:
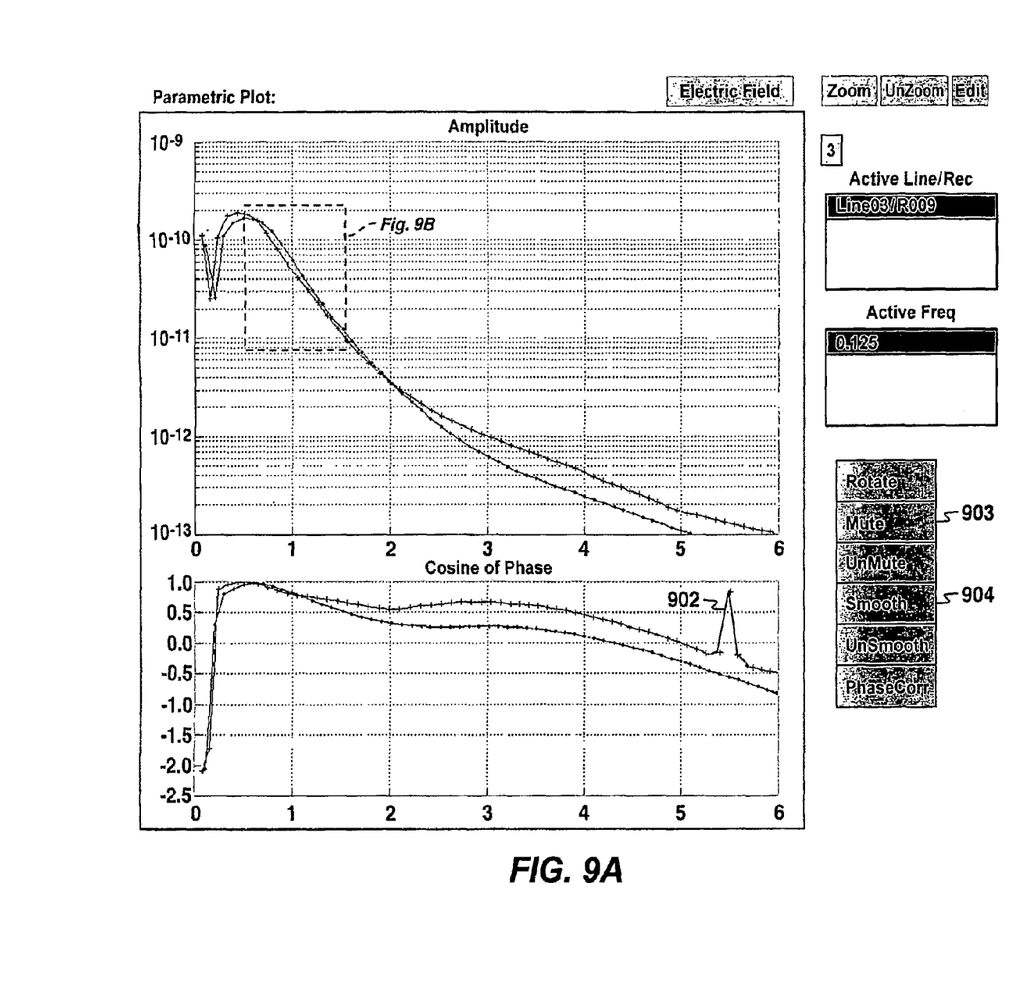
FIG. 9A shows a parametric plot display with graphical user interface from one embodiment of the present invention.
Figure 9B:
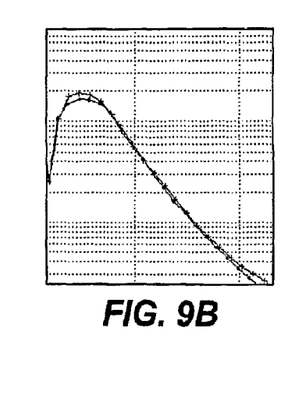
FIG. 9B shows the result of a bulk horizontal shift operation.

3. At step 803, again using button 131 on the Control Panel, the user displays positive and negative offsets receiver by receiver in another Parametric Display window, illustrated in FIG. 9A. (The horizontal axis is offset, and one of the curves is for positive offsets, and the other for negative offsets.) Because very near offsets are mainly sensitive to sea water conductivity, near positive and negative offsets should overlap. If there is a slight mismatch, as there is at 901, it may be due to some imperfection in the processing stream or a navigation error. Typically, a small horizontal bulk shift of the transmitter location in the towing direction (less than 100 m) will fix the problem. The required bulk shift is typed in the EMIM Control Panel (column 119 in FIG. 1). In this instance, a shift of 30 m in the towing direction produces the improved result shown in FIG. 9B. If the discrepancy between positive and negative near offsets is greater than 100 m, it is either caused by an abrupt change in the transmitter elevation close to the receiver or by an abrupt change in the resistivity of the very shallow sediment at the receiver location. These effects will be taken into account in the later 3D modeling step.

4. At step 804, the user applies additional muting 804 based on the phase stability. Experience has shown that a convenient way to check the phase stability is to display its cosine versus offset. The curve should be smooth. For instance the spike 902 of the phase cosine curve in FIG. 9A between offset 5 and 6 km will be graphically muted out through command 903. The user can improve the phase stability (especially at far offsets) by locally restacking the data within a larger, user-defined, stacking window, typically 300 to 600 m (command 904). Spikes in the electric field such as 902 (probably caused by lightning) should be muted before restacking.

5. The user can now prepare the cleaned data for 1D inversion in step 805. The user selects receivers from the EMIM Control Panel. The command To_1DInv (142 in FIG. 1) prompts the user to define a starting model: sea water resistivity, transition zone between water and sediment, initial resistivity values, resistivity bounds (fields 701 to 705 in FIG. 7). It has been found to be preferable to use a measured sea water resistivity profile and relatively thick a priori layers in the sediment (typically 300 m). The survey parameters (antenna length, receiver and transmitter depths) and the actual data are automatically retrieved from the information stored in EMIM. However, because the data are usually smooth, it is a good practice to decimate the data to save computation time. It is sufficient to keep an electric field value every 200 m (field 706). Finally, the residual error at which the inversion process stops is defined in field 707. The default value of 0.1 has proven to be very consistent to ensure an excellent fit to the actual data if a 1D model can be found to explain them.

6. At step 806, 1D-inversions are performed, in an external inversion package, independently on each positive and negative offset leg of each receiver. In this embodiment of the invention, the 1D inversion package is an external tool (indicated by the dashed-line box 806) because of its demands on computer resources. However, the selected frequencies are inverted together. If the data were adequately decimated and the initial layering was not too thin, 1D inversion can be a relatively quick process. Generally, close to the edge of a resistivity anomaly, the inversion program cannot find a 1D model that fits the observed data due to failure of the earth to satisfy the 1D assumption. The residual criterion defined in 707 cannot be reached and the inversion stops after a pre-specified number of iteration (15 iterations is a typical stopping point). (Inversion involves iterative simulations, with an automated adjustment to the resistivity model, based on closeness to measured data, made between iterations.) The external inversion package may, but does not have to, use an internal 1D simulation pkg. to perform its simulation steps.

7. Then, at step 807, the results of the 1D-inversions (resistivity profiles and the corresponding 1D-simulations) are loaded into EMIM for quality control, display and manipulation (command 104 in FIG. 1).

8. Sometimes, the results of 1D-inversion show some inconsistency in the data and it may be necessary (step 808) to return to the processing stage 800 to correct processing mistakes.

9. 1D-inversion assumes a perfectly layered earth and its results are only a first step in a thorough interpretation process. However, 1D-inversion results can show meaningful variations in the regional resistivity. Also, the discrepancy between what was modeled by the 1D-simulation and the actual data shows potential 3D effects to the experienced interpreter. With the command 1D to Viz (140 in FIG. 1), the user can create resistivity sections by combining the results of the 1D-inversions along the same tow line and load them into commercial visualization packages or model building packages (e.g., Gocad, GeoFrame or Petrel). These results, combined with well information, seismic data, magneto-telluric survey and any other available information are the basis to build an initial 3D-resistivity model at step 809.

10. Then, the electro-magnetic response of the resistivity model is simulated at step 810 with the appropriate codes using an external 3D simulation package. (The embodiment of the invention assumed for this example recognizes that with present computer resources, a capability such as a 3D simulation (or inversion) package may need to be external to EMIM.)

11. The results of the 3D simulations are loaded at step 811 into EMIM (command 102 in FIG. 1).

12. They can be compared 812 at different frequencies to the actual data:
  receiver by receiver (using FIG. 3 displays) with the command Mirror (132 in FIG. 1),
  along tow lines (as in FIG. 4) with the command AlongLine (133 in FIG. 1),
  in relative amplitude cross-sections with the command RaSec 134,
  in relative amplitude maps (FIG. 5) with the command RaMap 135.

Such comparison shows where the actual data are more resistive or less resistive than the simulated earth model. The process then revisits step 809 where the user then modifies the earth model accordingly to better fit the observed data, and the loop 809 to 812 is repeated until a good agreement is reached (a convergence criterion or other stopping point). For more detail on performing this part of the work flow, see, for instance, U.S. Patent Publication US 2006/021788, "A Method for Spatially Interpreting Electromagnetic Data Using Multiple Frequencies."

13. The actual data can also be prepared for 3D-inversion (step 813). Usually, some additional editing or phase correction is required (step 804). In a typical work flow where 3D inversion is to be used, steps 805 through 812 might be skipped.

14. The 3D-inversion (step 814) would probably be run outside EMIM under present day computer constraints. It is a very compute-intensive step.

15. At step 815, the synthetic results are loaded back into EMIM for quality control and for reformatting of the final resistivity model into a file that can be read by an external visualization package (step 816).

FIG. 10 is a flow chart for guiding a programmer to write or put together a software program 1000 for some embodiments of the present invention.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A computer implemented method for interpreting data from a controlled-source electromagnetic survey of a subsurface region, comprising:
   (a) providing a graphical user interface allowing selection of electromagnetic data and their manipulation or display by one or more selected tools;
   (b) providing a plurality of data manipulation and display tools, each accessible from a graphical user interface;
   (c) providing layered data storage for frequency-domain electromagnetic field data volumes, each layer corresponding to a certain survey to source line, frequency and receiver, and being allocated to receive at least the following types of data or information:
      (A) frequency;
      (B) type of processing used for actual data, or identification of resistivity model assumed for synthetic data;
      (C) receiver identification and geometry information for survey receivers, including (x,y,z) coordinates and 3D orientation angles;
      (D) source information including (x,y,z) location and data specifying source antenna shape as a function of time; and
      (E) electromagnetic data corresponding to parameters (A)-(D);
   wherein the electromagnetic data in each layer, whether real data or synthetic data, are stored with the same internal structure; and
   (d) using a software program comprising the features provided in steps (a)-(c) to interpret the electromagnetic data to predict hydrocarbon potential of the subsurface region.

2. The method of claim 1, wherein the data manipulation and display tools include at least one of a group of tools performing functions consisting of:
   (a) loading data;
   (b) selecting one or more electromagnetic field datasets;
   (c) displaying one or more selected datasets, including co-rendering two or more datasets;
   (d) editing a selected dataset;
   (e) simulating electromagnetic data in at least one-dimension at a selected source frequency;
   (f) creating pseudo-simulations of electromagnetic data to duplicate a simulation for one receiver location at least one other receiver location;
   (g) linking to visualization or modeling software programs;
   (h) linking to an inversion software program for inversion of a selected electromagnetic dataset to infer resistivity structure; and
   (i) a 1D simulation tool that solves Maxwell's electromagnetic field equations for electromagnetic field values at a specified location given a resistivity model and survey source parameters.

3. The method of claim 2, wherein the editing tool includes at least one option from a group consisting of:
   (a) rotating receiver orientation;
   (b) muting data from selected source locations;
   (c) reactivating previously muted data;
   (d) stacking common receiver data from specified different offsets;
   (e) restoring stacked data to pre-stacked values; and
   (f) correlating phases of an actual electromagnetic dataset to those of a synthetic dataset.

4. The method of claim 2, wherein the loading data tool includes capability to convert coordinate systems while data are being loaded, thereby ensuring that the data being loaded has the same internal structure as data in other data layers.

5. The method of claim 2, wherein the data displaying tool includes at least one option from a group consisting of displaying in a single display:
   (a) electromagnetic data from selected different data layers corresponding to a selected receiver, as a function of source-receiver offset;
   (b) electromagnetic data from a single data layer corresponding to different receivers along a source tow line;
   (c) a section of electromagnetic data from one data layer normalized by data from another layer;
   (d) a map of electromagnetic data from one data layer normalized by data from another layer; and
   (e) a map showing selected receiver and line locations from the survey.

6. The method of claim 2, wherein the data displaying tool includes an option for clearing a display of data.

7. The method of claim 1, wherein one tool is a 1D inversion tool that infers a 1D resistivity model from a selected electromagnetic dataset.

8. The method of claim 7, wherein the software program includes a tool for reformatting results from the 1D inversion tool.

9. The method of claim 1, wherein one tool performs a horizontal shift of all source locations by a constant selected amount along survey source lines.

10. The method of claim 1, wherein one tool approximates a locus of source locations along a source tow line by an average straight line fitted to actual source locations.

11. The method of claim 2, wherein the data displaying tool includes an option for displaying a selected trigonometric function of data values in a display of electromagnetic phase data.

12. The method of claim 11, wherein the selected trigonometric function is the cosine function.

13. The method of claim 1, wherein one tool is a 1D electromagnetic simulation tool that takes into account orientation and shape of source transmitter antennas and receiver antennas.

14. The method of claim 1, wherein every tool, and every option within a tool, is activated by a button on a graphical user interface.

15. The method of claim 1, wherein the tools include one that prepares data for an external 3D simulation program.

16. The method of claim 15, wherein the tools include one for loading results from the 3D simulation program.

17. The method of claim 1, wherein the tools include one that prepares data for an external 3D inversion program.

18. The method of claim 17, wherein the tools include one for loading results from the 3D inversion program.

19. The method of claim 1, wherein said tools are programmed to expect electromagnetic data with a common, pre-selected internal structure.

20. The method of claim 1, wherein each data storage layer further comprises identification of the survey from which the data were obtained.

21. The method of claim 1, further comprising data storage for resistivity data for use in generating synthetic electromagnetic data.

* * * * *